US010189178B2

(12) United States Patent
Gier et al.

(10) Patent No.: US 10,189,178 B2
(45) Date of Patent: Jan. 29, 2019

(54) METHOD FOR PRODUCING WOOD MATERIAL PANELS, IN PARTICULAR OSB WOOD MATERIAL PANELS, AND WOOD MATERIAL PANEL THAT CAN BE PRODUCED IN ACCORDANCE WITH SAID METHOD

(71) Applicant: SWISS KRONO Tec AG, Lucerne (CH)

(72) Inventors: Andreas Gier, Mandelbachtal (DE); Norbert Kalwa, Horn-Bad Meinberg (DE); Dirk Mueller, Neuruppin (DE)

(73) Assignee: SWISS KRONO Tec AG, Lucerne (CH)

( * ) Notice: Subject to any disclaimer, the term of this patent is extended or adjusted under 35 U.S.C. 154(b) by 0 days.

(21) Appl. No.: 15/526,142

(22) PCT Filed: Mar. 9, 2015

(86) PCT No.: PCT/EP2015/054844
§ 371 (c)(1),
(2) Date: May 11, 2017

(87) PCT Pub. No.: WO2016/074805
PCT Pub. Date: May 19, 2016

(65) Prior Publication Data
US 2017/0312936 A1 Nov. 2, 2017

(30) Foreign Application Priority Data
Nov. 13, 2014 (EP) .................... 14193012

(51) Int. Cl.
| | |
|---|---|
| B27N 3/00 | (2006.01) |
| B29D 7/01 | (2006.01) |
| C08G 18/71 | (2006.01) |
| C08G 18/83 | (2006.01) |
| C08K 3/36 | (2006.01) |
| C08G 18/00 | (2006.01) |
| C09J 5/06 | (2006.01) |
| C09J 11/04 | (2006.01) |
| C09J 11/06 | (2006.01) |
| C09J 11/08 | (2006.01) |
| C09J 161/00 | (2006.01) |
| C09J 161/28 | (2006.01) |
| C09J 175/04 | (2006.01) |
| C08L 97/00 | (2006.01) |
| C09J 183/10 | (2006.01) |
| B27N 3/04 | (2006.01) |
| B29C 43/00 | (2006.01) |
| B29C 43/22 | (2006.01) |
| C09J 5/00 | (2006.01) |
| C08G 77/14 | (2006.01) |
| C08G 77/26 | (2006.01) |
| B29K 75/00 | (2006.01) |
| B29K 509/02 | (2006.01) |
| B29K 511/14 | (2006.01) |
| C08K 5/544 | (2006.01) |
| C08K 9/06 | (2006.01) |

(52) U.S. Cl.
CPC ............... *B27N 3/002* (2013.01); *B27N 3/04* (2013.01); *B29C 43/003* (2013.01); *B29C 43/22* (2013.01); *B29D 7/01* (2013.01); *C08G 18/003* (2013.01); *C08G 18/718* (2013.01); *C08G 18/837* (2013.01); *C08K 3/36* (2013.01); *C08L 97/002* (2013.01); *C09J 5/00* (2013.01); *C09J 5/06* (2013.01); *C09J 11/04* (2013.01); *C09J 11/06* (2013.01); *C09J 11/08* (2013.01); *C09J 161/00* (2013.01); *C09J 161/28* (2013.01); *C09J 175/04* (2013.01); *C09J 183/10* (2013.01); *B29K 2075/00* (2013.01); *B29K 2509/02* (2013.01); *B29K 2511/14* (2013.01); *B29K 2995/0077* (2013.01); *C08G 77/14* (2013.01); *C08G 77/26* (2013.01); *C08K 5/544* (2013.01); *C08K 9/06* (2013.01); *C09J 2400/303* (2013.01); *C09J 2475/00* (2013.01)

(58) Field of Classification Search
CPC ....... B27B 3/002; B29C 43/003; B29C 43/22; C09J 175/04; C09J 5/00; C09J 11/04; C09J 11/06; C09J 2475/00; C09J 2400/303; B27N 3/04; B29K 2075/00; B29K 2511/14; B29K 2995/0077; B29K 2509/02; C08K 3/36; C08K 5/544; C08K 9/06
USPC ........................................................... 524/14
See application file for complete search history.

(56) References Cited

U.S. PATENT DOCUMENTS

| | | | |
|---|---|---|---|
| 5,505,772 A | 4/1996 | Kharazipour et al. | |
| 6,187,426 B1 | 2/2001 | Jonschker et al. | |
| 2006/0147183 A1* | 7/2006 | Mae ..................... | G11B 27/034 386/243 |
| 2007/0102108 A1 | 5/2007 | Zheng et al. | |

(Continued)

FOREIGN PATENT DOCUMENTS

| | | |
|---|---|---|
| DE | 4345196 A1 | 2/1995 |
| DE | 102010034997 A1 | 2/2012 |

(Continued)

*Primary Examiner* — Hui H Chin
(74) *Attorney, Agent, or Firm* — The Webb Law Firm

(57) ABSTRACT

A method of producing wood-base panels, especially OSB wood-base panels is provided. The method including the steps of providing wood strands, applying at least one adhesive system to the wood strands having at least one polymer adhesive and at least one nanoparticle below 500 nm, and pressing the wood strands admixed with the adhesive system to form wood-base panels.

16 Claims, No Drawings

(56) References Cited

U.S. PATENT DOCUMENTS

2013/0065997 A1     3/2013    Gahlmann
2013/0331484 A1*   12/2013    Braum ................. C08G 18/003
                                                               524/14
2014/0363664 A1    12/2014    Gier et al.

FOREIGN PATENT DOCUMENTS

| EP | 0842967 | A2 | 5/1998 |
| EP | 2615126 | A1 | 7/2013 |
| EP | 2447332 | B1 | 1/2014 |
| RU | 2190521 | C2 | 10/2002 |
| RU | 2413614 | C2 | 3/2011 |
| WO | 3728937 | | 8/1997 |

* cited by examiner

METHOD FOR PRODUCING WOOD MATERIAL PANELS, IN PARTICULAR OSB WOOD MATERIAL PANELS, AND WOOD MATERIAL PANEL THAT CAN BE PRODUCED IN ACCORDANCE WITH SAID METHOD

CROSS-REFERENCE TO RELATED APPLICATIONS

This application is the United States national phase of International Application No. PCT/EP2015/054844 filed Mar. 9, 2015, and claims priority to European Patent Application No. 14193012.3 filed Nov. 13, 2014, the disclosures of which are hereby incorporated in their entirety by reference.

BACKGROUND OF THE INVENTION

Field of the Invention

The present invention relates to a method of producing wood-base panels, especially oriented strand board (OSB) wood-base panels and to a wood-base panel obtainable by this method.

Description of Related Art

OSB panels are wood-base panels produced from strands, i.e., long flakes. OSB panels, originally generated as waste products of the veneer and plywood industry, are now being increasingly used in wooden and prefabricated house construction, since OSB panels are lightweight yet meet the static requirements of construction panels. OSB panels are accordingly used as construction panels and as wall or roof paneling or else in flooring.

OSB panels are produced in a multi-step process where initially the flakes or strands are cut out of barked roundwood, preferably softwoods, in the longitudinal direction by rotating blades. The subsequent drying operation at high temperatures serves to reduce the natural moisture content of the strands. The moistness or otherwise of the strands may vary according to the adhesive used. This is because the wettability of an adhesive may vary on rather moist strands versus on dry strands. In addition, very little moisture should ideally be present in the strands during the pressing operation in order that the vapor pressure developing during the pressing operation may be very substantially reduced, or otherwise the raw panel could burst.

After drying, the strands are introduced into a resination apparatus in which the resin/adhesive is applied, in finely divided form, to the flakes. The resins used are overwhelmingly PMDI (polymeric diphenylmethane diisocyanate) or MUPF (melamine-urea-phenol-formaldehyde) resins. Mixed forms of the resins are also employable in the OSB panels. These resins are used because, as mentioned above, OSB panels are frequently used for construction-type applications. Resins used there have to be resistant to moisture/wetness.

After resination, the resinated strands are scattered, in scattering apparatuses, alternatingly along and across the machine direction, so the strands come to be disposed cross-wise in no fewer than three layers (a bottom layer—a central layer—a top layer, where the scattering direction is the same for the bottom and top layers, but different from that of the central layer).

After scattering, the strands are subjected to a continuous press under high pressure and high temperature at, for example, 200 to 250° C.

However, testing of OSB panels with regard to their technological values reveals that strength values and fracture photographs from destructive tests suggest there are issues with the resin wetting on the strands. It is known, for example, that softwoods contain different amounts of fatty acids in their cell surfaces depending on the time of year. These elevated amounts of fatty acids compromise the wetting of the wood surface by resins, resulting in reduced transverse tensile strength values. Since, in construction, certain minimum strengths have to be guaranteed and/or external tests have to be documented, however, the resin quantity has to be raised with these products. This leads to extra costs and to more testing. In addition, as a result, the quantity of inferior, off-spec grades creases creases.

Accordingly, the production of OSB panels which have to meet minimum requirements in terms of the strength gives rise to disadvantages, such as extra costs due to the use of larger resin/adhesive quantities, increased testing and a large amount of inferior grade panels (a higher proportion of B-grade product).

SUMMARY OF THE INVENTION

A problem addressed by the present invention is therefore that of overcoming the adduced disadvantages in the production of OSB panels and to provide a method making it possible to reduce the quantities of resin/adhesive used. This problem is solved according to the invention by a method having features as described herein and by a wood-base panel having features as described herein.

The present invention accordingly provides a method of producing wood-base panels, especially OSB wood-base panels, comprising the steps of:
a) providing wood chips (wood strands);
b) applying at least one adhesive system to the wood strands, wherein the adhesive system comprises:
  at least one polymer adhesive, and
  at least one nanoparticle below 500 nm, wherein the at least one particle is modified with at least one compound of general formula (I)

$$R_a SiX_{(4-a)} \quad (I),$$

or of general formula (II)

$$O_b X_c (OH)_d R_e SiO_{(4-b-c-d-e)/2} \quad (II),$$

where
  X is H, OH or a hydrolyzable moiety selected from the group comprising halogen, alkoxy, carboxyl, amino, monoalkylamino or dialkylamino, aryloxy, acyloxy, alkylcarbonyl,
  R is a nonhydrolyzable organic moiety R selected from the group comprising substituted and unsubstituted alkyl, substituted and unsubstituted aryl, substituted and unsubstituted alkenyl, substituted and unsubstituted alkynyl, substituted and unsubstituted cycloalkyl, which may each be interrupted by —O— or —NH—, and
  wherein R may include at least one functional group Q selected from a group containing an epoxy, hydroxyl, ether, amino, monoalkylamino, dialkylamino, substituted and unsubstituted anilino, amide, carboxyl, acryloyl, acryloyloxy, methacryloyl, methacryloyloxy, mercapto, cyano, alkoxy, isocyano, aldehyde, alkylcarbonyl, acid anhydride and/or phosphoric acid group, a is=0, 1, 2, 3, especially 0 or 1,
b, c, d are=0 or 1, and
e is=1, 2, 3;
wherein the adhesive system is admixed to the wood strands in an amount between 1.0 and 2.5 wt %, preferably between 1.5 and 2.4 wt % and more preferably between 2.0 and 2.2 wt % based on the wood strands, and c) pressing the wood strands admixed with the adhesive system to form wood-base panels.

The present method, by using the adhesive system composed of polymer adhesive and nanoparticles modified with silane compounds, makes it possible to reduce the water-resistant resin/adhesive quantity typically used in the production of wood-base panels, such as OSB panels, by at least 20 to 30% from conventional water-resistant adhesives. The reduction due to the adhesive system employed here in the amount of water-resistant costly adhesives used for panels for construction applications is appreciable and enables a distinctly cheaper production of the panels while properties remain the same, especially as regards transverse tensile strength.

It is believed that the use of the adhesive system composed of polymer adhesive and nanoparticles modified with silane compounds work to effect an improvement in the wetting of the strand surface with the resin and also an improved adherence of the resin to the strand surface. The improved adherence of the resin to the strand surface serves in turn to ensure that, as regards the strength level of the OSB panels, variations are reduced and additionally permanent adaptations to seasonal variations can ideally be omitted entirely.

The silane compounds are reactive with the wood surface and thereby serve to improve the adherence of the resin/polymer adhesive to the wood surface. The silane compounds, which are chemically bonded to the nanoparticles, thus have not only reactive/functional groups, for example OH groups, for chemical attachment to the employed polymer adhesive, for example formaldehyde adhesive or PMDI adhesive, but also at least one functional group, for example isocyanate or glycidyl groups, for chemical attachment to free OH groups of cellulose on the strand surface. The nanoparticles modified with silane compounds thus constitute a mediator substance between the matrix of the polymer adhesive and the wood surface of the strands.

What is more, any even partial absorption/diffusion of the adhesive system into the wood matrix of the strands can be prevented, since the modified nanoparticles have hydrophilic moieties which prevent any penetration into the hydrophobic wood matrix and/or the fatty acid layer present on the strand surface.

The wood strands used in the present invention may have a length between 50 to 200 mm, preferably 70 to 180 mm and more preferably 90 to 150 mm, a width between 5 to 50 mm, preferably 10 to 30 mm and more preferably 15 to 20 mm, and a thickness between 0.1 and 2 mm, preferably between 0.3 and 1.5 mm, more preferably between 0.4 and 1 mm.

The preference in one embodiment of the present method is for the use of a polymer adhesive selected from the group containing formaldehyde adhesives, polyurethane adhesives, epoxy resin adhesives, polyester adhesives. The formaldehyde condensate adhesive used may be especially a phenol-formaldehyde resin adhesive (PF), a cresol/resorcinol-formaldehyde resin adhesive, urea-formaldehyde resin adhesive (UF) and/or melamine-formaldehyde resin adhesive (MF).

The preference herein is for the use of a polyurethane adhesive, in which case the polyurethane adhesive is based on aromatic polyisocyanates, especially polydiphenylmethane diisocyanate (PMDI), tolylene diisocyanate (TDI) and/or diphenylmethane diisocyanate (MDI), with PMDI being particularly preferable. One preferred version uses solely a polyurethane adhesive, i.e., no further adhesive systems are employed in this case.

However, the present method has a further embodiment where it is possible to use more than one polymer adhesive. It is thus possible to use a first polymer adhesive comprising at least one polycondensation adhesive such as a polyamide, polyester, silicone and/or formaldehyde-condensate adhesive, especially a phenol-formaldehyde resin adhesive (PF), a cresol/resorcinol-formaldehyde resin adhesive, urea-formaldehyde resin adhesive (UF) and/or melamine-formaldehyde resin adhesive (MF), and a second polymer adhesive comprising at least one polyaddition adhesive such as an epoxy resin, polycyanurate and/or polyurethane adhesive, especially a polyurethane adhesive based on polydiphenylmethane diisocyanate (PMDI). Hybrid adhesive systems of this type are known from EP 2 447 332 B1.

The moiety X is advantageously selected from a group containing fluorine, chlorine, bromine, iodine, $C_{1-6}$alkoxy, especially methoxy, ethoxy, n-propoxy and butoxy, $C_{6-10}$aryloxy, especially phenoxy, $C_{2-7}$acyloxy, especially acetoxy or propionoxy, $C_{2-7}$alkylcarbonyl, especially acetyl, monoalkylamino or dialkylamino of $C_1$ to $C_{12}$, especially $C_1$ to $C_6$. Particularly preferred hydrolyzable groups are $C_{1-4}$alkoxy groups, especially methoxy and ethoxy.

The non-hydrolyzable R is preferably selected from a group comprising substituted and unsubstituted $C_{1-30}$alkyl, especially $C_{5-25}$alkyl, substituted and unsubstituted $C_{2-6}$alkenyl, substituted and unsubstituted $C_{2-6}$alkynyl and substituted and unsubstituted $C_{6-10}$aryl.

In one embodiment, the non-hydrolyzable moiety R is selected from the group containing methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, phenyl and naphthyl.

The term "non-hydrolyzable organic moiety" in the context of the present invention is to be understood as meaning an organic moiety which in the presence of water does not lead to the formation of an OH or $NH_2$ group linked to the silicon atom.

In one version, the at least one functional group Q is selected from a group containing epoxy, hydroxyl, ether, acryloyl, acryloyloxy, methacryloyl, methacryloyloxy, alkoxy, cyano and/or isocyano groups. The at least one functional group Q, which is present in the organic non-hydrolyzable moiety R, in a further version advantageously comprises an epoxy group, especially a glycidyl or glycidyloxy group, an amine group or an isocyano group.

The functional groups via which crosslinking is possible comprise especially groups capable of chain growth addition polymerization and/or polycondensation reactions, while the term chain growth addition polymerization reaction is to be understood as also comprehending polyaddition reactions. The functional groups are preferably selected such that an organic crosslinking between the polymer adhesive and the wood surface and optionally also between various adhesive systems can be executed via optionally catalyzed chain growth addition polymerization and/or condensation reactions.

The silanes used in a particularly preferred embodiment are tetraethoxysilane, methyltriethoxysilane, gamma-isocyanatopropyltriethoxysilane or a glycidyloxypropyltriethoxysilane.

In a preferred embodiment, the particles are modified/mixed with two or more, preferably three or more different compounds of general formulae (I) and/or (II).

It is thus possible to use an adhesive system in which a first compound conforms to the formula $SiX_4$ where X is OH or alkoxy, especially methoxy, ethoxy, n-propoxy or i-propoxy, and a second compound conforms to the formula $R_aSiX_{(4-a)}$ where a=1 or 2, X is OH or alkoxy, especially methoxy, ethoxy, n-propoxy or i-propoxy, R is methyl, ethyl, n-propyl or n-butyl and Q is a glycidyl or glycidyloxy group, an alkoxy, an amine group or an isocyano group. Here the molar ratio of first and second compound may be 0.1 to 1 mol, preferably 0.1 to 0.5 mol and more preferably 0.1 to 0.4 mol. A third compound may likewise conform to the formula $R_aSiX_{(4-a)}$ where a=1 or 2, where R where X is OH or alkoxy, especially methoxy, ethoxy, n-propoxy or i-propoxy and R is methyl, ethyl, n-propyl or n-butyl (i.e., R here is not provided a functional group Q).

As described, the non-hydrolyzable moiety R does not necessarily have at least one functional group Q. In addition, the moiety R may also be substituted with further moieties.

The term "substituted", in use with "alkyl", "alkenyl", "aryl", etc., designates the replacement of one or more atoms, in general hydrogen atoms, by one or more of the following substituents, preferably by one or two of the following substituents: halogen, hydroxyl, protected hydroxyl, oxo, protected oxo, $C_3$-$C_7$ cycloalkyl, bicyclic alkyl, phenyl, naphthyl, amino, protected amino, monosubstituted amino, protected monosubstituted amino, disubstituted amino, guanidino, protected guanidino, a heterocyclic ring, a substituted heterocyclic ring, imidazolyl, indolyl, pyrrolidinyl, $C_1$-$C_{12}$ alkoxy, $C_1$-$C_{12}$ acyl, $C_1$-$C_{12}$ acyloxy, acryloyloxy, nitro, carboxyl, protected carboxyl, carbamoyl, cyano, methylsulfonylamino, thiol, $C_1$-$C_{10}$ alkylthio and $C_1$-$C_{10}$ alkylsulfonyl. The substituted alkyl groups, aryl groups, alkenyl groups may each be substituted one or more times, preferably one or two times, with the same or different substituents.

The term "alkynyl" as used herein designates a moiety of the formula R—C≡C—, especially a "$C_2$-$C_6$ alkynyl". Examples of $C_2$-$C_6$ alkynyls include: ethynyl, propynyl, 2-butynyl, 2-pentynyl, 3-pentynyl, 2-hexynyl, 3-hexynyl, 4-hexynyl, vinyl and also di- and tri-ynes of straight and branched alkyl chains.

The term "aryl" as used herein designates aromatic hydrocarbons, for example phenyl, benzyl, naphthyl or anthryl. Substituted aryl groups are aryl groups which, as defined above, are substituted with one or more substituents as defined above.

The term "cycloalkyl" comprehends the groups cyclopropyl, cyclobutyl, cyclopentyl, cyclohexyl and cycloheptyl.

The particles used with preference have a size between 2 and 400 nm, preferably between 2 to 100 nm and more preferably between 2 to 50 nm. The particles may more particularly be oxidic, hydroxidic or oxyhydroxidic in nature, which are obtainable via different methods such as, for example, the ion exchange process, the plasma process, sol-gel methods, grinding or else flame deposition. A preferred embodiment uses particles based on $SiO_2$, $Al_2O_3$, $ZrO_2$, $TiO_2$, SnO.

A preferred embodiment uses $SiO_2$ particles having a particle size of 10 to 20 nm, for example 12 or 17 nm. The $SiO_2$ particles may be present in an aqueous suspension in the form of a colloid. Here the $SiO_2$ is present in the form of single mutually uncrosslinked spherical particles which are surface hydroxylated.

In a further embodiment, the polymer adhesive content of the adhesive system used in the present invention is not less than 90 wt %, preferably not less than 80 wt %, more preferably not less than 70 wt %. The silane compounds and particles are each used in an amount between 1 to 15 wt %, preferably 3 to 13 wt % and more preferably between 5 to 10 wt % based on the total amount of polymer adhesive. The solvent content, which is essentially due to the use of the silanes, is likewise between 1 to 15 wt %, preferably 3 to 13 wt % and more preferably between 5 to 10 wt %. These particulars do not, however, initially take account of the solvent content from the polymer adhesive used.

In a preferred embodiment, the adhesive system is sprayed onto the wood strands. In this embodiment, the modified nanoparticles may be mixed with the polymer adhesive before spraying, or, as is also conceivable, the modified nanoparticles are applied separately to the wood strands prior to the step of spraying with the polymer adhesive.

The step of pressing the wood strands sprayed with the present adhesive system is preferably effected at temperatures between 150 and 250° C. and more preferably effected at temperatures between 200 and 220° C.

The adhesive system used herein is obtainable in a process comprising the steps of:
a) importing at least one particle into a dispersion or suspension of a (first) polymer adhesive;
b) admixing at least one first compound of the general formulae (I) and/or (II) and optionally a polymerization initiator,
c) optionally admixing at least one second compound of general formulae (I) and/or (II) other than the first compound of general formulae (I) and/or (II),
d) admixing at least one catalyst, especially an acid.

In a further step, a further second polymer adhesive may likewise be admixed to the adhesive system. The second polymer adhesive preferably differs from the first polymer adhesive. It is conceivable, for example, to use a polyurethane adhesive such as, for example, PMDI as first polymer adhesive and a formaldehyde adhesive such as a melamine-formaldehyde adhesive as a second polymer adhesive.

The adhesive system used in the present invention is likewise obtainable in a process comprising the steps of:
a) mixing two or more different compounds of general formulae (I) and (II),
b) admixing at least one particle to the mixture obtained in step a) and optionally admixing at least one catalyst, especially an acid,
c) admixing at least one (first) polymer adhesive.

In this case, too, a further second polymer adhesive may be admixed in a further step.

Useful polymerization initiators include, for example, dibutylisotin dilaurate, oxazolidine, bisoxazolidine, zinc chloride and also compounds classed as ketimines or aldimines.

Organic and/or inorganic acids useful as catalyst are selected from a group containing phosphoric acid, acetic acid, ρ-toluenesulfonic acid, hydrochloric acid, formic acid or sulfuric acid. Also suitable are ammonium salts such as ammonium sulfate, which react like weak acids.

The particles are preferably used in an amount between 1 to 15 wt %, preferably 3 to 13 wt % and more preferably between 5 to 10 wt %. It is also possible to admix to the mixture the particles in an amount between 0.1-10 wt %, preferably 0.5-5 wt % and more preferably 1-2 wt %.

The temperatures throughout the entire process of making the adhesive system are typically in ranges between 20 to 80° C., preferably between 30 to 60° C.

It is likewise possible to prepare the present adhesive system in a process which initially only employs precursors from the abovementioned substances and the nanoscale particles are allowed to grow in solution. An alcoholic solution, for example isopropanol, is initially charged for this. Then, ρ-toluenesulfonic acid and a particle material such as, for example, zirconium n-propoxide is admixed to form nanoscale particles in solution, which are subsequently further modifiable.

The OSB wood-base panel produced using the present method has a polymer adhesive content, or an adhesive system content, of 1.0 and 2.5 wt %, preferably 1.5 and 2.4 wt % and more preferably 2.1 and 2.2 wt % based on the total amount of the wood strands. In one version, the OSB wood-base panel contains a polyurethane adhesive or a formaldehyde adhesive as polymer adhesive, preferably solely a polyurethane adhesive.

It must be noted that the use of the present adhesive system in the OSB wood-base panels does not change the technological values of the panels such as transverse tensile strength and flexural strength as compared with conventional adhesives without the modified nanoparticles.

Accordingly, the present invention provides an OSB wood-base panel which has a reduced adhesive content without change in its technological values. The use of the present adhesive system composed of polymer adhesive and silane-modified nanoparticles provides at least partial prevention of any absorption of the polymer adhesive such as PMDI resin into the wood matrix.

DETAILED DESCRIPTION OF THE INVENTION

The invention will now be more particularly described with reference to several working examples.

Working Example 1: Preparing a First Adhesive System

An initial charge is provided in the form of a urethane matrix (PMDI) which still contains OH groups and/or unbound cyanato groups. $SiO_2$ particles are stirred into the urethane matrix at a concentration of 0.1-10 wt % preferably 0.5-5 wt % preferably 1-2 wt %. This is followed by the admixture of an isocyanatopropyltriethoxysilane and possibly of a dibutylisotin dilaurate initiator in case an initiator is not already present in the polyurethane. This mixture is heated to 50° C. and maintained at 50° C. for about 30 minutes. After cooling down to room temperature, a glycidyloxypropyltriethoxysilane and an acid, for example phosphoric acid, as catalyst are admixed and stirred in for a further 60 minutes. The polyurethane-silane-$SiO_2$ mixture thus obtained can then optionally be mixed with a melamine resin matrix.

Working Example 2: Preparing a Second Adhesive System

An ethanol-water mixture is initially charged and admixed with a mixture of glycidyloxypropyltriethoxysilane and tetraethoxysilane. This is followed by the admixture of an aqueous silica sol solution, i.e., nanoscale $SiO_2$ particles in water, and also the admixture of an acid, for example acetic acid or para-toluenesulfonic acid, as catalyst and stirring for 5 minutes. After a stirring time of 5 minutes, the PMDI adhesive is admixed. Thereafter the adhesive system is ready to use.

Working Example 3: Preparing a Third Adhesive System

An ethanol-water mixture is initially charged and admixed with a mixture of 111.36 g of glycidyloxypropyltriethoxysilane (0.4 mol), 20.33 g of tetraethoxysilane (0.1 mol) and 17.8 g of methyltriethoxysilane. This is followed by the admixture of 114 g of an aqueous silica sol solution (Kieselsol A200/30), i.e., nanoscale $SiO_2$ particles (particle size 12 nm) in water, and also the admixture of 4 g of para-toluenesulfonic acid, as catalyst and stirring for 5 minutes. After a stirring time of 5 minutes, the PMDI adhesive is admixed. Thereafter the adhesive system is ready to use.

Working Example 4: Preparing a Fourth Adhesive System

An ethanol-water mixture is initially charged and admixed with a mixture of 111.36 g of glycidyloxypropyltriethoxysilane (0.4 mol), 20.33 g of tetraethoxysilane (0.1 mol) and 17.8 g of methyltriethoxysilane. This is followed by the admixture of 114 g of an aqueous silica sol solution (Kieselsol A200/30), i.e., nanoscale $SiO_2$ particles (particle size 17 nm) in water, and also the admixture of 4 g of para-toluenesulfonic acid, as catalyst and stirring for 5 minutes. After a stirring time of 5 minutes, the PMDI adhesive is admixed. Thereafter the adhesive system is ready to use.

Then, the third and fourth adhesive systems are applied to a flakeboard specimen and a flakeboard sample respectively. In each case 1 ml of the solution was applied to a cut area of the flakeboard sample and dried in a drying cabinet at 100° C. for 15 minutes. The depth of penetration of the solution was then determined by visual inspection. Five flakeboard specimens each were tested per experiment.

Purely PMDI resin absorbs in this procedure (curing at 100° C. for 15 min) far into the flakeboard sample and thus disappears from the adhesive-adherend interface. In fact, the PMDI resin disappears so far into the flakeboard sample that this is discernible on the reverse side of the flakeboard sample as well as on the front side.

By contrast, the admixture of 5 wt % of modified $SiO_2$ particles as per the third and fourth working examples to the PMDI resin leads to a different result following curing at 100° C. for 15 min. On the front side and the reverse side, signs of penetration by the modified resin are barely discernible (working example 3) or completely absent (working example 4). On increasing the level of modified $SiO_2$ particles to 20 wt % and curing at 100° C. for 15 min, the resin even remains completely on the surface and appears to foam up slightly.

The results are unambiguous in showing that admixture of modified $SiO_2$ nanoparticles to a PMDI foam is effective in preventing any absorption/diffusion of the PMDI resin into the wood fibers/strands, making it possible to reduce the binder quantity required in the manufacturing process of wood-base panels.

Working Example 5: Producing an OSB Panel

An OSB line was used to manufacture OSB panels (18 mm) under standard conditions.

PMDI resin was used in the outer layers and the central layer, the resin fraction amounting to 2.9 wt % based on strands (absolutely dry wood) (comparative panel).

In a test, the silane described above under working example 2 was admixed, in an amount of 5 wt %, to the PMDI resin. The modified PMDI resin was used to manufacture OSB panels using a resin fraction based on the strands of 2.4 wt %. The transverse tensile strength of the panels was then determined. A value of 0.43 N/mm² was found for the test panel. A value of 0.44 N/mm² was determined for the comparative panel.

This shows that a significant reduction in resin provides nearly the same technological values. The silanes coupled to nanoscale particles appear to be effective in at least partly preventing the absorption of the PMDI resin into the wood matrix.

What is claimed is:

1. A method of producing an OSB wood-base panel, comprising the steps of:
    a) providing wood strands;
    b) applying at least one adhesive system to the wood strands, wherein the adhesive system comprises:
    solely a polyurethane adhesive, and
    nanoparticles below 500 nm, wherein at least one nanoparticle is modified with at least one compound of general formula (I)

  (I), or of general formula (II)

  (II), where
        X is H, OH or a hydrolyzable moiety selected from the group consisting of: halogen, alkoxy, carboxyl, amino, monoalkylamino or dialkylamino, aryloxy, acyloxy, alkylcarbonyl,
        R is a nonhydrolyzable organic moiety R selected from the group consisting of: substituted and unsubstituted alkyl, substituted and unsubstituted aryl, substituted and unsubstituted alkenyl, substituted and unsubstituted alkynyl, substituted and unsubstituted cycloalkyl, which may each be interrupted by —O— or —NH—, and
        wherein R may include at least one functional group Q selected from a group containing an epoxy, hydroxyl, ether, amino, monoalkylamino, dialkylamino, substituted and unsubstituted anilino, amide, carboxyl, acryloyl, acryloyloxy, methacryloyl, methacryloyloxy, mercapto, cyano, alkoxy, isocyano, aldehyde, alkylcarbonyl, acid anhydride and/or phosphoric acid group,
        a is =0, 1, 2, 3,
        b, c, d are=0 or 1, and
        e is =1, 2, 3;

wherein the adhesive system is admixed to the wood strands in an amount between 1.0 and 2.5 wt % based on the wood strands, and
    c) pressing the wood strands admixed with the adhesive system to form the wood-base panel.

2. The method as claimed in claim 1, wherein the wood strands have a length between 50 to 200 mm, a width between 5 to 50 mm, and a thickness between 0.1 and 2 mm.

3. The method as claimed in claim 1, wherein the polyurethane adhesive is based on polydiphenylmethane diisocyanate (PMDI).

4. The method as claimed in claim 1, wherein X is selected from a group containing fluorine, chlorine, bromine, iodine, $C_{1-6}$alkoxy, $C_{6-10}$aryloxy, $C_{2-7}$acyloxy, $C_{2-7}$alkylcarbonyl, monoalkylamino or dialkylamino of $C_1$ to $C_{12}$.

5. The method as claimed in claim 1, wherein R is selected from a group consisting of: substituted and unsubstituted $C_{1-30}$alkyl, substituted and unsubstituted $C_{2-6}$alkenyl, substituted and unsubstituted $C_{2-6}$alkynyl and substituted and unsubstituted $C_{6-10}$aryl.

6. The method as claimed in claim 1, wherein R is selected from a group containing methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, phenyl and naphthyl.

7. The method as claimed in claim 1, wherein the at least one functional group Q is selected from a group containing epoxy, hydroxyl, ether, acryloyl, acryloyloxy, methacryloyl, methacryloyloxy, alkoxy, cyano and/or isocyano groups.

8. The method as claimed in claim 1, wherein the at least one functional group Q is an epoxy group, an amine group or an isocyano group.

9. The method as claimed in claim 1, wherein the at least one nanoparticle has a size between 2 and 400 nm.

10. The method as claimed in claim 1, wherein the at least one nanoparticle comprises an oxidic, hydroxidic or oxyhydroxidic nanoparticle.

11. The method as claimed in claim 1, wherein the modified nanoparticles are used in an amount between 1 to 15 wt % based on the total amount of polyurethane adhesive.

12. The method as claimed in claim 1, wherein the modified nanoparticles are admixed to the polyurethane adhesive or are applied to the wood strands before resination thereof.

13. An OSB wood-base panel obtained by a method as claimed in claim 1, comprising an adhesive content between 1.0 and 2.5 wt % based on the total amount of the wood strands.

14. The method of claim 1, wherein a is =0 or 1.

15. The method of claim 1, wherein the adhesive system is admixed to the wood strands in an amount between 2.0 and 2.2 wt % based on the wood strands.

16. The method of claim 3, wherein the polyurethane adhesive based on PMDI is the sole polymer adhesive.

* * * * *